United States Patent
Gilliom

[11] 3,806,700
[45] Apr. 23, 1974

[54] BALANCED SELF-CLEANING OVEN
[75] Inventor: John W. Gilliom, Mansfield, Ohio
[73] Assignee: The Tappan Company, Mansfield, Ohio
[22] Filed: Oct. 30, 1972
[21] Appl. No.: 302,094

[52] U.S. Cl.................. 219/413, 219/398, 219/491
[51] Int. Cl........................ F27d 11/02, A21b 1/02
[58] Field of Search .......... 219/393, 396, 398, 412, 219/413, 482, 491

[56] References Cited
UNITED STATES PATENTS

| | |
|---|---|
| 3,293,410 | 12/1966 Welch.................. 219/393 |
| 3,350,542 | 10/1967 Getman................ 219/412 |
| 3,353,004 | 11/1967 Alexander............ 219/398 |
| 3,484,858 | 12/1969 Jordan et al......... 219/413 |
| 3,549,862 | 12/1970 Holtkamp............ 219/482 |
| 3,604,896 | 9/1971 Anderson et al..... 219/412 |
| 3,610,883 | 10/1971 Holtkamp............ 219/413 |
| 3,639,727 | 2/1972 Leach.................. 219/491 |
| 3,668,371 | 6/1972 Fry et al............... 219/413 |

*Primary Examiner*—Volodymyr Y. Mayewsky
*Attorney, Agent, or Firm*—Donnelly, Maky, Renner & Otto

[57] ABSTRACT

A balanced self-cleaning oven having a broil element and a bake element for broiling and baking food in the oven cavity utilizes an automatic control system for latching the oven door and energizing only the bake element providing a balance in the oven of temperature, air, and exhaust gases during self-cleaning operation. Manual, timer, motor, and temperature sensitive controls provide more reliable and safe operation.

7 Claims, 3 Drawing Figures

| | OFF | P-HEAT | BAKE | T-BAKE | BROIL | CLEAN |
|---|---|---|---|---|---|---|
| 50a-51a | | | | | X | |
| 50b-51b | | X | | | X | |
| 50b-52b | | | | | | |
| 50c-51c | | X | X | | | |
| 50d-52d | | | | | | X |
| 50e-52e | | X | X | X | | X |
| 50f-51f | | X | X | X | X | |
| 50f-52f | | | | | | X |

PATENTED APR 23 1974          3,806,700
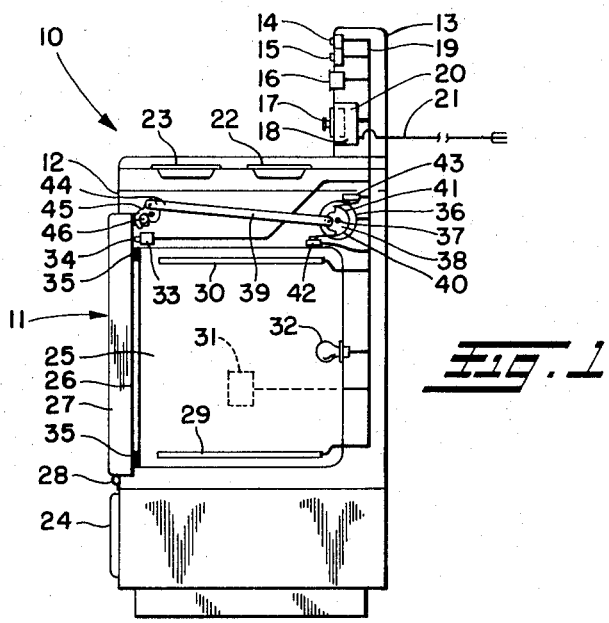
Fig.1
| | OFF | P-HEAT | BAKE | T-BAKE | BROIL | CLEAN |
|---|---|---|---|---|---|---|
| 50a-51a | | | | | X | |
| 50b-51b | X | | | | X | |
| 50b-52b | | | | | | |
| 50c-51c | | X | X | | | |
| 50d-52d | | | | | | X |
| 50e-52e | | X | X | X | | X |
| 50f-51f | | X | X | X | X | X |
| 50f-52f | | | | | | X |
Fig.3
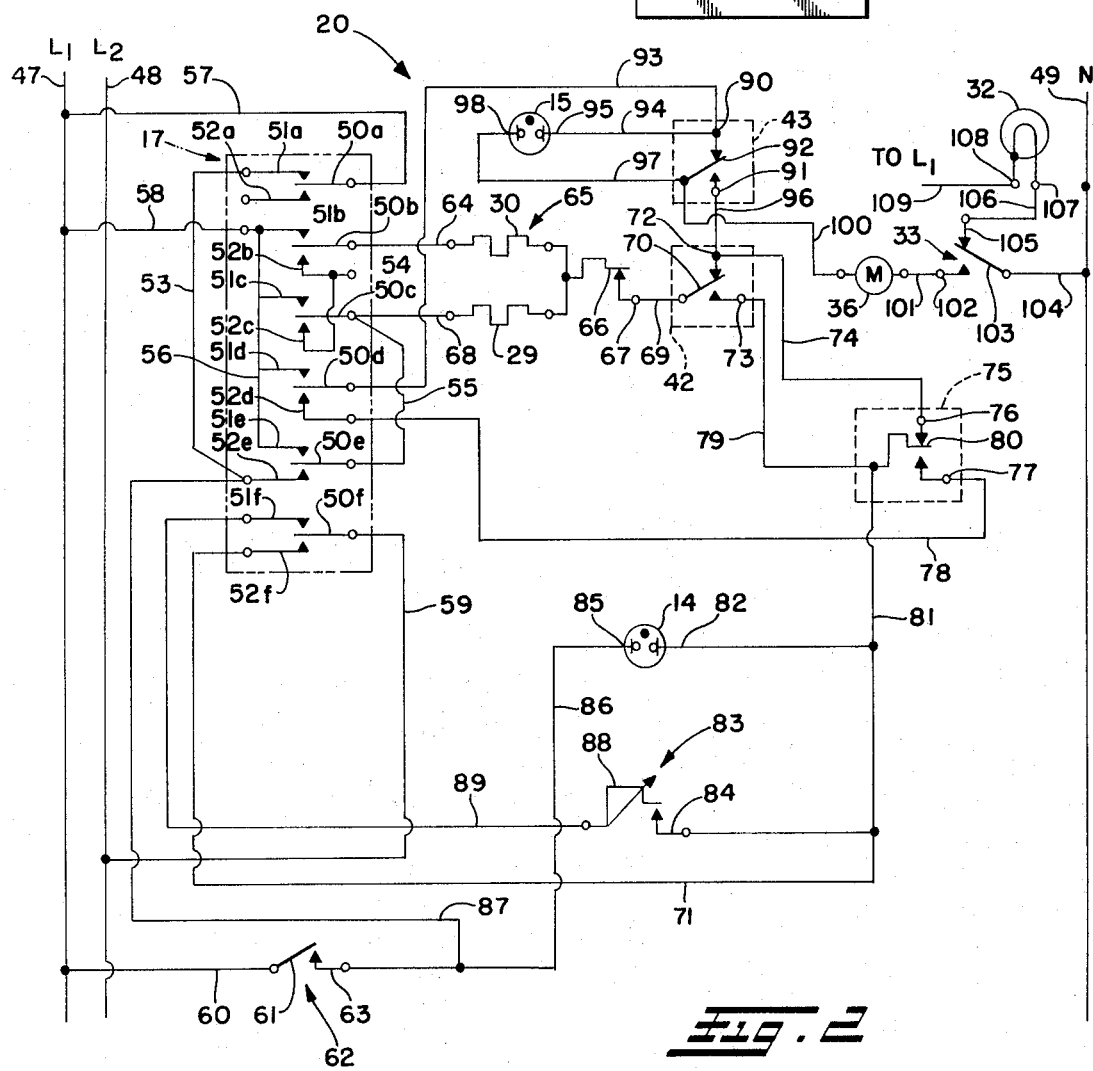
Fig.2

BALANCED SELF-CLEANING OVEN

BACKGROUND OF THE INVENTION

This invention relates to a balanced self-cleaning oven.

Electric ovens using electric resistance elements for generating heat within the oven cavity are known in the art, and such prior art electric ovens generally include a broil heating element and a bake heating element, respectively, for broiling and baking in the oven. Usually the broil heating element is positioned near the top portion of the oven, while the bake heating element is positioned near the bottom or sides of the oven, with the broil element generally having a lower electric resistance than the bake element to produce the high temperatures necessary for broiling. Such prior art electric ovens have been used with either 120 volt or 240 volt power and have used both the broil and bake heating elements during self-cleaning operation, and those which use 240 volt power for one heating element and 120 volt for the other require relatively complicated power circuits.

There have been some limitations experienced in prior art electric self-cleaning ovens, such as for example, slowness in preheating, occasional failure of circuit elements, undesirable grease explosions, and the occurrence of thermal barriers. The imbalance of temperature and airflow in the oven due to the usual rapid temperature rise creates the aforementioned thermal barriers which adversely effect the exhaust of oven gases through the catalytic device commonly used to eliminate smoke and combustion in the exhaust.

SUMMARY OF THE INVENTION

Accordingly, a primary object of the invention is to provide a safe, efficient balanced self-cleaning oven.

A further object of the invention is to provide a balanced self-cleaning oven which reduces preheat time.

Another object of the invention is to provide a balanced self-cleaning oven which relatively slowly increases oven temperature during cleaning operation providing a balance between heat, incoming air and exhaust gases and avoiding the build up of thermal barriers.

An additional object of the invention is to provide a balanced self-cleaning oven which during cleaning operation uses only the bake element thereby relatively slowly increasing oven temperature to avoid explosions, fires, and the redeposition of exploded grease, permitting a balance between temperature, air, and exhaust gases in the oven, preventing occurrence of thermal barriers, and efficiently utilizing power.

A still further object of the invention is to provide a balanced self-cleaning oven having free access to the oven cavity upon initiation of cleaning operation and which is prevented from reaching pyrolysis temperature until after automatic latching of the oven door occurs.

An even further object of the invention is to provide a balanced self-cleaning oven having a multiposition selector switch controlling operation thereof and a plurality of temperature operated and motor operated switch devices to control oven operation.

These and other objects are realized in the instant invention which comprises a safe balanced self-cleaning oven efficiently operable to perform various cooking and self-cleaning operations.

To the accomplishment of the foregoing and related ends, the invention, then, comprises the features hereinafter fully described, the following description and the annexed drawing setting forth in detail a certain illustrative embodiment of the invention, this being indicative, however, of but one of the various ways in which the principles of the invention may be employed.

BRIEF DESCRIPTION OF THE DRAWING

In the annexed drawing:

FIG. 1 is a side elevation view of a balanced self-cleaning oven in an electric range appliance;

FIG. 2 is a schematic electric circuit for the balanced self-cleaning oven of FIG. 1; and FIG. 3 is a chart indicating connections made in the oven power circuit.

DESCRIPTION OF THE PREFERRED EMBODIMENT

Referring now to the drawing wherein like reference numerals refer to like elements in the several figures, an electric range appliance 10 having a balanced self-cleaning oven 11 positioned in the main cabinet or body 12 thereof is shown in FIG. 1. The appliance 10 includes a control panel 13 shown atop the former for convenience and accessibility. Within the control panel 13 are various control elements and indicators for the appliance including an oven pilot light 14, an oven lock light 15, a clock timer 16, and a multiposition selector switch 17. Within the control panel is a control box 18, although the latter may be located at another convenient position with respect to the appliance, and a main electric cable 19 couples various elements of the appliance to the control box and/or to each other. The main power circuit 20 for the oven is positioned within the control box 19, and a pigtail 21 or other connecting device couples the appliance to a source of electric power not shown. In the preferred embodiment, the appliance is connected to 220-240 volt power for efficient operation.

The balanced self-cleaning oven 11 of the invention may be an individual unit adaptable for built-in use in a kitchen or alternatively may be used in a total electric range appliance 10, for example as shown in FIG. 1. The electric range appliance may include one or more individual burners 22 and 23 for range top cooking and may also include a storage drawer 24 at the bottom thereof. The balanced self-cleaning oven 11 includes an oven cavity 25, which may be thermally insulated, having a front access opening 26 closed by a door 27, which may pivot about a horizontal hinge 28, as shown. Other types of doors, such as pivoting or sliding doors, may be used in the invention.

Within the oven cavity is positioned a bake heating element 29 and a broil heating element 30 for cooking food within the oven cavity 25 and a temperature sensitive device 31 is positioned to sense the temperature of the oven cavity. An oven light 32 for illuminating the oven cavity 25 when the door 27 is open is controlled by a door switch 33, such as for example, a mechanical switch having an external plunger 34, which senses the open or closed position of the door.

Because the temperature within the oven cavity 24 may reach 900°–950° F., the temperature at which pyrolysis occurs, the oven cavity may be insulated from the other portions of the appliance or from the cabinet into which the balanced self-cleaning oven 11 is built by insulating material, not shown. Further, the door 27 may include insulating material, and a thermally insulating gasket 35 may be located around the front access opening 26 where the door 27 and the walls of the oven cavity 25 are in contact. Generally during pyrolysis it is necessary for air to enter the oven cavity 25, and a tortuous passageway for the entrance of such air may be formed in the gasket 35 along the lower edge of the door 27. It has been a practice in prior art self-cleaning ovens to locate openings in the top wall of the oven to permit the escape of gases to a catalytic exhaust system during self-cleaning operation, and although such catalytic exhaust is not shown in the drawing, such may be used in the instant invention.

An electric motor 36 having a drive shaft 37 with a gear 38 mounted thereon for moving an eccentrically coupled actuating rod 39 is positioned within the appliance 10 proximate the balanced self-cleaning oven 11. The gear 38 preferably includes at least one or more cams 40 and 41 for controlling bistable switches 42 and 43 as the motor rotates. The actuating rod 39 is connected at the end 44 distal from the motor to a latch 45 engageable with a keeper 46 attached to the door 27 for securely latching the door.

The power circuit 20 for the balanced self-cleaning oven 11 is shown in FIG. 2 receiving electric power from first and second power lines 47 and 48 and from a neutral power line 49. Such power lines may be connected from the control box 18 through the pigtail 21, as shown in FIG. 1, to a power source. The primary manual control for the power circuit 20 is the multiposition selector switch 17 having a plurality of switches a-f operable, for example by a plurality of cam elements mounted on a rotatable shaft, not shown, but well known in the art. Each individual switch within the multiposition selector switch 17 includes a normally centered movable switch blade 50 a-f and first and second fixed contacts 51 a-f. Jump connectors 53, 54 and 55 interconnect fixed contacts 51 a with 52 e, 52 b with 52 c and switchblades 50 c with 50 e, respectively. Jump connector 56 connects fixed contacts 51 b, c, d and e together. The conductors 57 and 58 connect the first power line 47 to switchblade 50 a and to fixed contacts 51 b, c, d and e, respectively; and conductor 59 connects the second power line 48 to the switchblade 50 f. A conductor 60 also connects the first power line 47 with the movable switchblade 61 of a timer operated switch 62, also having a fixed contact 63 and controlled by the clock timer 16, shown in FIG. 1.

The broil heating element 30, which may be an electric resistance element that emits heat when electrically energized, is connected at one end by a conductor 64 to the switchblade 50 b and at the other end to a temperature sensitive switch 65 having a movable switchblade 66 urged to abut a fixed contact 67 when the oven temperature is below a set temperature, as for example in a well known thermostat switch. The thermostat switch 65 is designed to open the circuit therethrough at a temperature of about 900°–950° F. at which pyrolysis occurs. The bake heating element 29 is connected at one end by a conductor 68 to the switchblade 50 c and by the jump connector 55 to the switchblade 50 e and at the other end to the switchblade 66 of the thermostat 65. The fixed contact 67 of the thermostat 65 is connected by a conductor 69 to the movable switchblade 70 of the first bi-stable switch 42 which has fixed contacts 72 and 73. The first bi-stable switch 42 may be, for example, a mechanical, magnetic, solid state, or other type switch having two stable positions, and in the preferred embodiment the switchblade 70 of the first bi-stable switch may be operated by the cam 40 associated with the motor 36, as shown in FIG. 1.

The fixed contact 72 of the first bi-stable switch 42 is connected by a conductor 74 to a double contact temperature sensitive switch or thermostat 75 at the first fixed contact 76 thereof, the second fixed contact 77 being connected by a conductor 78 to the fixed contact 52 d of the multiposition selector switch 17. The fixed contact 73 of the first bi-stable switch 42 is connected by a conductor 79 to the movable switchblade 80 of the double contact temperature sensitive switch 75. The double contact temperature sensitive switch 75 may be a double contact type thermostat switch wherein the movable switchblade 80 is urged against the first fixed contact 76 when the temperature in the oven is below the maximum oven temperature used in cooking, for example broiling temperature of approximately 550° F., and is urged against the second fixed contact 77 when the oven temperature exceeds such temperature.

The conductor 79 and the movable switchblade 80 of the double contact temperature sensitive switch 75 are connected by a conductor 81 to a first contact 82 of the oven pilot light 14, to an adjustable temperature sensitive switch or bake thermostat 83 at the fixed contact 84 thereof, and to the fixed contact 52 f of the multiposition selector switch 17. The other contact 85 of the oven pilot light 14 is connected by a conductor 86 to the fixed contact 63 of the timer operated switch 62 and additionally by a conductor 87 to the fixed contact 52 e and by the jump connector 53 to the fixed contact 51 a of the multiposition selector switch 17. The bake thermostat 83 has a movable switchblade 88, which is urged to abut the fixed contact 84 when the oven temperature is below a set cooking temperature and is urged away from the fixed contact when the oven temperature is above such temperature. The movable switchblade 88 of the bake thermostat 83 is connected by a conductor 89 to the fixed contact 51 f in the multiposition selector switch 17, and an adjustable setting device, not shown, for the bake thermostat may be located on the control panel 13, shown in FIG. 1.

The second bi-stable switch 43, which may be similar to the first bi-stable switch 42, having first and second fixed contacts 90 and 91 and a movable switchblade 92 is connected at the fixed contact 90 by a conductor 93 to the switchblade 50 d in the multiposition selector switch 17 and by a conductor 94 to one contact 95 of the oven lock light 15. The fixed contact 91 is connected by a conductor 96 to the fixed contact 72 of the first bi-stable switch 42. The switchblade 92 of the second bi-stable switch 43 is connected by a conductor 97 to the other contact 98 of the oven lock light 15 and by a conductor 100 to one side of the motor 36.

The other side of the motor 36 is connected by a conductor 101 to the door switch 33 at the first fixed contact 102 thereof. The movable switchblade 103 of the door switch is responsive to the open and closed position of the door 27, shown in FIG. 1, and is connected by a conductor 104 to the neutral power line 49. The second fixed contact 105 of the door switch 33 is connected by a conductor 106 to one contact 107 of the oven light 32, which is connected at the other contact 108 thereof by a conductor 109 to the first power line 47.

Referring now to FIG. 3, a chart indicates by appropriately marked boxes the connections to be made in the multiposition selector switch 17 to enable the oven power circuit 20 to perform the operations of pre-heat, bake, time-bake, broil, and clean. As described above, the multiposition selector switch 17 may include a rotatable adjusting device, not shown, having six positions representing the off condition and the five operations shown in FIG. 3, with a plurality of cam elements for urging respective switchblades 50 a–f against the desired fixed contacts 51 a–f or 52 a–f depending on the position of the device. Alternatively, other types of multiposition selector switches may be used in the invention to select an operating mode for the balanced self-cleaning oven, such as for example, a sliding switch or a solid state switching device.

The description of the several modes of operation — pre-heat, bake, time-bake, broil, and clean — of the balanced self-cleaning oven follows.

Ovens generally require timed pre-heating to raise in a reasonable time the oven temperature to a useful temperature at which food may be cooked, i.e., baked or broiled. The oven described hereinabove performs efficient heating during the preheat cycle using both the broil and bake heating elements connected in parallel by switchblades 50 b and c and fixed contacts 51b and c of the multi-position selector switch 17 to the first power line 47 at one end thereof and to the thermostat 65 at the other end thereof. The current flow path for the heating elements is completed through the first bi-stable switch 42, having the switchblade 70 abutting the contact 72; the thermostat 75, having the switchblade 80 abutting the contact 76 since the oven temperature is usually below the maximum cooking temperature of about 550° F. except during cleaning operation; the bake thermostat 83, being preset to the desired oven cooking temperature; and the contact 51 f and switchblade 50 f of the multiposition selector switch 17 to the second power line 48. During pre-heat operation the oven pilot light 14 is connected across the first and second power lines 47 and 48 by the conductors 86 and 87, the contact 52 e and the switchblades 50 e of the multiposition selector switch 17, and the jump connector 55 to indicate that the oven is energized. After the oven has reached its useful cooking temperature as set on the bake thermostat, the pre-heat operation is completed; the oven is then ready for use in the bake, time-bake, broil, and/or cleaning operations as will be described hereinafter.

For bake operation the multi-position selector switch 17 is adjusted to the bake position, for example the several cams therein urging the switchblades 50 c, e, and f respectively to abut the contacts 51 c, 52 e, and 51 f. This adjustment permits current to flow from the first power line 47 via the multi-position selector switch 17 to the bake heating element 29 for energization thereof. Current flowing through the bake heating element 29 continues through the thermostat 65, the conductor 69, the switchblade 70 and contact 72 of the first bi-stable switch 42, the contact 76 and switchblade 80 of the thermostat 75, and the pre-set bake thermostat 83. The conductor 89 connected at contact 51 f and switchblade 50 f and the conductor 59 complete the circuit for the bake heating element 29 to the second power line 48, and the oven pilot light 14 is connected as described above to indicate oven energization. When the power circuit 20 is connected for bake operation, current may only flow through the circuit when the bake thermostat 83, which senses oven temperature, is closed. When the oven reaches the useful baking temperature, the bake thermostat opens until the temperature within the oven drops several degrees, at which time the bake thermostat will again close to energize the bake heating element. For convenience, all of the thermostats 65, 75, and 83 may be positioned in or near the oven cavity as schematically shown at 31 in FIG. 1.

The oven power circuit 20 may alternatively be connected for time-bake operation, and during such operation current may flow through the bake heating element 29 only when the timer operated switch 62 is closed by adjusting the multi-position selector switch 17 to the time-bake position, the cams therein urging the switchblades 50 e and f respectively to the contacts 52 e and 51 f according to the table in FIG. 3, and by setting the clock timer 16. When the power circuit 20 is in the time-bake configuration and the timer switch 62 is closed, the bake heating element 29 may be energized by current flowing from the first power line 47 through the timer switch 62 to the contact 52 e, switchblade 50 e, and jump connector 55 of the multiposition selector switch and conductor 68. The current flow from the bake heating element 29 is completed through the thermostat 65; the switchblade 70 and contact 72 of the first bi-stable switch 42; the contact 76 and switchblade 80 of the thermostat 75; and the conductor 81 to the bake thermostat 83, connected to the second power line 48, as described above. The oven pilot light 14 is also connected, as described above, to indicate oven energization. Operation of the power circuit 20 for time bake operation, is similar to that described with respect to bake operation, except that upon automatic opening of the timer switch 62, as controlled by the clock timer 16, the bake heating element 29 will be de-energized.

For broiling the multi-position selector switch 17 may be adjusted to tne broil position whereby the switchblades 50 a, b, and f are urged respectively to abut contacts 51 a, b and f to couple the power circuit 20 for broiling. In such circuit configuration, the broil heating element 30 may be energized by direct connection at one side thereof through the multi-position selector switch 17 to the first power line 47, and at the other side thereof through the thermostat 65, the switchblade 70 and contact 72 of the first bi-stable switch 42, the contact 76 and switchblade 80 of the thermostat 75, the bake thermostat 83 set at broil position, and the conductors 89 and 59 to the second power line 48. The oven pilot light 14 is coupled, as described above, to indicate oven energization.

While oven temperature during the pre-heat, bake, and time-bake operations rarely exceeds 450° F., the oven temperature may reach about 550° F. during broiling. It is important that during broiling operation the current for energizing the broil heating element 30 flows through both the thermostat 75 and the bake thermostat 83, both of which open the power circuit 20 when the oven temperature exceeds such maximum cooking temperature of about 550° F., thereby limiting oven temperature to such maximum and eliminating the possibility of perilous high temperature levels. The use of two such thermostats provides a back-up safety system whereby in the event of failure of one such thermostat, the other thermostat would operate to limit temperature rise in the oven. Similarly, when the oven is connected for pre-heat, bake, or time-bake operations, the current to the heating elements 29 and 30 always must flow through both the thermostat 75 and the bake thermostat 83 as previously described.

The oven power circuit 20 may be connected for self-cleaning operation, whereby the temperature within the oven is raised to a temperature at which pyrolysis occurs, for example, about 900°–950° F. When the multi-position selector switch 17 is adjusted to the clean position, the switchblades 50 d, e, and f respectively abutting contacts 52 d, e, and f, a bypass circuit is provided for the bake thermostat 83, which is only adjustable within the cooking temperature range of up to about 550° F., as described above. In such circuit configuration potential energization circuits for the motor 36 through the second bi-stable switch 43 and the door switch 33 and for the bake heating element 29 through the timer operated switch 62 are provided. In normal self-cleaning operation only the bake heating element 29 is used; and after the multi-position selector switch 17 is set to the clean position and the oven door 27 is closed completing one part of the potential circuit for the motor 36 by the closed door switch 33, then the clock timer 16 of the timer operated switch 62 is set for the desired length of cleaning time. The oven is then ready for energization.

Upon closing the timer operated switch 62, for example by pressing a start button, not shown, the bake heating element 29 is energized through the conductor 87; the contact 52 e, switchblade 50 e, and jump connector 55 of the multi-position selector switch 17; and conductor 68. Current energizing the bake heating element 29 flows through the bake heating element; the thermostat 65; the switchblade 70 and fixed contact 72 of the first bi-stable switch 42; the contact 76 and switchblade 80 of the thermostat 75; the conductors 81 and 71; the contact 52 f and switchblade 50 f of the multi-position selector switch; and the conductor 59 to the second power line 48. Before the oven temperature reaches about 550° F., the temperature at which the thermostat 75 is set to open the circuit between conductors 74 and 81, the oven door 27 may be opened providing accessibility to the oven. The oven temperature is limited by the thermostat 75 until the motor 36 has been energized to latch the oven door 27 and to urge the switchblade 70 of the first bi-stable switch 42 to abut the contact 73 thereof bypassing the thermostat 75.

When the oven temperature surpasses the temperature at which the thermostat 75 is set, i.e., about 550° F., the thermostat switches, whereby the switchblade 80 abuts the contact 77 to de-energize instantly the bake heating element 29, and to provide a circuit to one side of the motor 36 through the conductor 78, the contact 52 d and switchblade 50 d of the multi-position selector switch 17, the conductor 93, and the contact 90 and switchblade 92 of the second bistable switch 43. The motor circuit is completed by a connection at the other side of the motor by the closed door switch 33 along the conductors 101 and 104 to the neutral power line 49. Upon energization, the motor 36 turns, first, to latch the oven door 27 using a conventional latching mechanism schematically shown in the drawing, and, second, to change the states of the first and second bi-stable switches 42 and 43. The former is achieved, for example, as the activator rod 44 is driven by the rotating gear 38 to pivot the latch 45 to engage the keeper 46 attached to the oven door 27. The latter is effected as a cam member 40 located on the motor drive shaft 37 throws the switchblade 70 of the first bi-stable switch 42 to abut the contact 73 thereof to re-energize the bake heating element 20 by-passing the open circuit at the thermostat 75; as the gear 38 continues to rotate, the cam 41 throws the switchblade 92 of the second bi-stable switch 43 to abut the contact 91 thereof to de-energize the motor and to close the circuit including the conductors 94 and 97 for the oven lock light 15.

As the oven temperature increases beyond the aforementioned temperature at which the thermostat 75 is set, i.e., about 550° F., the temperature is limited by the thermostat 65 set to open the circuit to the bake heating element at a temperature of about 900°–950° F., and cleaning by pyrolysis will occur. Because only the bake heating element 29 is used during cleaning, the oven temperature increases relatively slowly eliminating the aforementioned problems of exploding grease, fire hazards, and occurrence of heat barrier at the top of the oven preventing flow of hot gases and wastes to the catalytic exhaust, not shown. Further, the slowly rising oven temperature permits a balanced inflow and outflow of air and exhaust gases, respectively, through the tortuous path opening in the gasket 35.

In the event of a failure in the timer operated switch 62, whereby the switchblade 61 may weld to the contact 63, the oven temperature would be limited by the thermostat 65 to a temperature of 900°–950° F. If a failure would occur in either of the thermostats 75 or 83, the bi-stable switches 42 or 43, the motor 36, the door switch 33, or other circuit elements, the bake heating element 29 may be de-energized by the timer operated switch 62 at the expiration of the set cleaning time or by an adjustment of the multi-position selector switch 17 to the off position. A further automatic safety feature of the invention is that the motor 36 will not operate to unlatch the oven door 27 until the oven temperature has dropped below 550° F. as sensed by the thermostat 75, regardless of the setting of the multi-position selector switch 17 or the timer operated switch 62.

During normal cleaning operation, when the time for cleaning the oven, as set on the clock timer 16, has expired, the timer operated swtich 62 will open to de-energizxe the bake heating element 29. While the oven 11 is cooling between 900°–950° F., its cleaning temperature, and 550° F. at which the thermostat 75 is designed to switch, the motor 36 remains de-energized retaining the oven door 27 in latched position. Upon reaching 550° F., the switchblade 80 of the thermostat 75 switches to abut the contact 76 to provide a completed electric circuit to energize the motor 36. As the energized motor 36 rotates, the cam 51 throws the switchblade 70 of the first bi-stable switch 42 to abut the contact 72 placing the thermostat 75 into any potential circuit for energizing the bake 29 or broil 30 heating elements; the oven door is unlatched; and the cam 40 throws the switchblade 92 of the second bistable switch 43 to abut the contact 90 de-energizing the motor and disconnecting the oven lock light 15.

As may now be understood, the instant invention defines a self-cleaning oven which is balanced for temperature, air, and gases co-acting during cleaning by pyrolysis, and which includes a multi-function oven power circuit with numerous built-in safety features to provide energization of the oven for pre-heat, bake, time-bake, broil, and clean operations.

The embodiments of the invention in which all exclusive property or privilege is claimed are defined as follows;

1. A balanced self-cleaning oven selectively operable in bake, broil and self-clean modes, the latter being carried out at temperatures at which effective pyrolytic cleaning occurs, comprising main body means, oven cavity means in said main body means, said oven cavity means having an access opening, door means for closing said access opening, said main body means, oven cavity means and door means being suitably insulated and capable of withstanding the high temperatures at which pyrolysis occurs, temperature responsive means for locking the door means during the self-clean mode, heating means including bake heating means and broil heating means, said heating means being positioned relative to said oven cavity means for heating the same, temperature sensitive means responsive to temperature in said oven cavity means, and circuit means selectively operable for effecting operation of said heating means to heat said oven in such bake, broil and self-clean modes, said circuit means being responsive to said temperature sensitive means, and said circuit including means for controlling operation of said oven including means for selectively connecting for energization said broil heating means for broiling and said bake heating means only for both baking and cleaning said oven cavity means, said means for controlling operation comprises electric circuit means providing power to said heating means and switch means for connecting said electric circuit means for selective energization of said heating means.

2. A balanced self-cleaning oven as set forth in claim 1 wherein said temperature sensitive means comprises first temperature sensitive means for controlling energization of said heating means during baking or broiling, second temperature sensitive means for controlling energization of said bake heating means during cleaning, and third temperature sensitive means for permitting energization of said bake heating means during cleaning without regard to said first temperature sensitive means.

3. A balanced self-cleaning oven as set forth in claim 2 wherein said third temperature sensitive means comprises a double throw thermostat means having a first position to complete a first electric circuit during baking and broiling and a second position to complete a second electric circuit during cleaning.

4. A balanced self-cleaning oven as set forth in claim 1 wherein said temperature sensitive means comprises first temperature sensitive means for controlling energization of said heating means during baking or broiling, second temperature sensitive means for controlling energization of said bake heating means during cleaning third temperature sensitive means for permitting energization of said bake heating means during cleaning without regard to said first temperature sensitive means, said first, second and third temperature sensitive means being connected in said electric circuit means to limit energization of said heating means in response to temperature in said oven cavity means, and said third temperature sensitive means providing a by-pass circuit for said second temperature sensitive means during cleaning.

5. A balanced self-cleaning oven as set forth in claim 4 wherein said third temperature sensitive means comprises a double throw thermostat means having a first position to complete a first electric circuit during cleaning.

6. A balanced self-cleaning oven as set forth in claim 1 further comprising timer operated switch means for connecting said electric circuit means to an electric power source.

7. A balanced self-cleaning oven as set forth in claim 1 wherein said temperature sensitive means comprises a double throw temperature sensitive switch means electrically coupled in said electric circuit means to provide a first circuit to said heating means when said oven cavity is at a first temperature and a second circuit to said heating means when said oven cavity is at a second temperature.

* * * * *